United States Patent
Yang et al.

(10) Patent No.: US 9,556,571 B1
(45) Date of Patent: Jan. 31, 2017

(54) FOLDABLE PORTABLE EXCREMENT PICK-UP DEVICE

(71) Applicants: Tianle Yang, Guangdong (CN); Yibao Zeng, Guangdong (CN)

(72) Inventors: Tianle Yang, Guangdong (CN); Yibao Zeng, Guangdong (CN)

(73) Assignee: ZHUHAI PRECISION SUPER TECHNOLOGY LTD., Zhuhai (CN)

( * ) Notice: Subject to any disclaimer, the term of this patent is extended or adjusted under 35 U.S.C. 154(b) by 0 days.

(21) Appl. No.: 15/153,916

(22) Filed: May 13, 2016

(30) Foreign Application Priority Data

Nov. 10, 2015 (CN) .................... 2015 2 0894853 U

(51) Int. Cl.
 *E01H 1/12* (2006.01)
 *A01K 29/00* (2006.01)
 *A01K 1/01* (2006.01)

(52) U.S. Cl.
 CPC .......... *E01H 1/1206* (2013.01); *A01K 1/0114* (2013.01); *E01H 2001/128* (2013.01); *E01H 2001/1286* (2013.01)

(58) Field of Classification Search
 CPC ............. E01H 1/1206; E01H 2001/126; E01H 2001/128; E01H 2001/1286; A01K 1/0114
 USPC ......................................................... 294/1.3
 See application file for complete search history.

(56) References Cited

U.S. PATENT DOCUMENTS

| | | | | |
|---|---|---|---|---|
| 3,986,744 A | * | 10/1976 | Krogstad | E01H 1/1206 119/867 |
| 5,385,376 A | * | 1/1995 | Malaspina | E01H 1/1206 15/257.6 |
| 5,564,763 A | * | 10/1996 | Mercurio | E01H 1/1206 294/1.3 |
| 5,669,645 A | * | 9/1997 | Chuang | E01H 1/1206 294/1.3 |
| 6,059,332 A | * | 5/2000 | Beascoechea Inchaurraga | E01H 1/1206 294/1.3 |
| 6,986,325 B1 | * | 1/2006 | Hsu | E01H 1/1206 119/161 |
| 2009/0261603 A1 | * | 10/2009 | Boghozian | E01H 1/1206 294/1.3 |

FOREIGN PATENT DOCUMENTS

DE      9203156      *   6/1993

* cited by examiner

*Primary Examiner* — Dean Kramer

(57) ABSTRACT

The disclosure provides a foldable portable excrement pick-up device. The device includes an upper housing and a lower housing which are combined to form a clip shape via a rotary shaft and a spring. The upper housing is composed of an upper handle and a cap-shaped upper housing body. The lower housing is composed of a lower handle and a bowl-shaped lower housing body. The upper handle and the lower handle are symmetrically arranged, the upper housing body and the lower housing body are hinged to form a clip shape in such a way that the rotary shaft penetrates through the upper hinging portion and the lower hinging portion, and the spring is arranged between the upper handle and the lower handle to make the upper housing body cover the lower housing body elastically in an openable/closeable manner.

7 Claims, 3 Drawing Sheets

FOLDABLE PORTABLE EXCREMENT PICK-UP DEVICE

CROSS-REFERENCE TO RELATED APPLICATIONS

The present application claims the benefit of Chinese Utility Model Application No. 201520894853.4 filed on Nov. 10, 2015, the contents of which are hereby incorporated by reference.

TECHNICAL FIELD

The disclosure relates to the field of pet supplies, and in particular to a foldable portable excrement pick-up device.

BACKGROUND

With the improvement of living standards, an increasing number of people begin to feed pets. People enjoy going out for a walk with pets at their leisure. However, the pets will defecate inevitably in this process, and excrement affects both the environment and the city appearance, and affects the physical health of people as well due to parasite spreading. A feeder needs to self-clear the excrement of a pet off in a general mode of picking the excrement up with paper by hand, transporting the excrement to an adjacent garbage bin and then throwing the excrement in it. This mode is not only inconvenient, but also insanitary. In the excrement clear-off process, the feeder will touch the excrement of the pet inevitably, and the disease is probably spread in this process.

It is not hard to see that the traditional art also has certain defects.

SUMMARY

The disclosure is intended to solve the technical problem about provision of a foldable portable excrement pick-up device, which assists in solving the problem of excrement handling after a pet defecates.

In order to achieve the aim, the disclosure adopts the technical solutions as follows.

A foldable portable excrement pick-up device is provided, which may include an upper housing and a lower housing which are combined to form a clip shape via a rotary shaft and a spring.

The upper housing may be composed of an upper handle and a cap-shaped upper housing body, the upper handle may be arranged at the tail of the upper housing body, and an upper hinging portion for rotary connection may be arranged at a joint between the upper housing body and the upper handle.

The lower housing may be composed of a lower handle and a bowl-shaped lower housing body, the lower handle may be arranged at the tail of the lower housing body, and a lower hinging portion for rotary connection may be arranged at a joint between the lower housing body and the lower handle.

The upper handle and the lower handle may be symmetrically arranged, the upper housing body and the lower housing body may be hinged to form a clip shape in such a way that the rotary shaft penetrates through the upper hinging portion and the lower hinging portion, and the spring may be arranged between the upper handle and the lower handle to make the upper housing body cover the lower housing body elastically in an openable/closeable manner.

Furthermore, the lower housing body may include a rigid lower housing frame ring, a flexible storage bin and a fixing clip configured to fix a garbage bag, the lower housing frame ring may be in a frame shape matched with the upper housing body, the lower handle may be arranged at the tail of the lower housing frame ring, the lower hinging portion may be arranged at a joint between the lower housing frame ring and the lower handle, an opening edge of the storage bin may be connected to the lower housing frame ring, and the fixing clip may be arranged on the lower handle.

Furthermore, a garbage bag bin may also be disposed on the upper housing, the garbage bag bin may be a bin body arranged on a surface of the upper housing and recessed into the surface, an openable/closeable bin cover may be arranged at the top of the garbage bag bin, and a garbage bag outlet may be provided on the bin cover.

Furthermore, one end of the bin cover may be hinged to the upper housing body, and the other end of the bin cover may be provided with an elastic buckle configured to control the bin cover to be opened and closed.

Furthermore, the bin cover may be further provided with an elongated bag-taking opening.

Furthermore, a hand-carrying hole may be provided on the upper handle.

Furthermore, the storage bin may be made of a flexible material and may be folded in a thin-film organ shape.

Furthermore, a small handle may be arranged on a bottom surface of the storage bin.

The foldable portable excrement pick-up device provided by the disclosure has the advantages as follows.

The device is convenient to clear excrement and garbage off, thereby preventing a human body from being polluted by the excrement or the garbage in a clear-off process to the greatest extent.

The device is convenient to use and carry, has a simple structure, is foldable, and effectively reduces a packaging size.

The device is safe to use and strong in sealing performance, can effectively prevent the excrement from leaking, and can be used for temporarily storing the excrement or the garbage.

BRIEF DESCRIPTION OF THE DRAWINGS

In order to describe the technical solutions in the embodiments of the disclosure or the traditional art more clearly, the drawings needing to be used in the descriptions of the embodiments or the traditional art will be simply introduced. Obviously, the drawings described below are only some embodiments of the disclosure. Other embodiments can be obtained according to these drawings on the premise of no creative work of those skilled in the art.

DRAWING MARK DESCRIPTIONS

Figure 1:
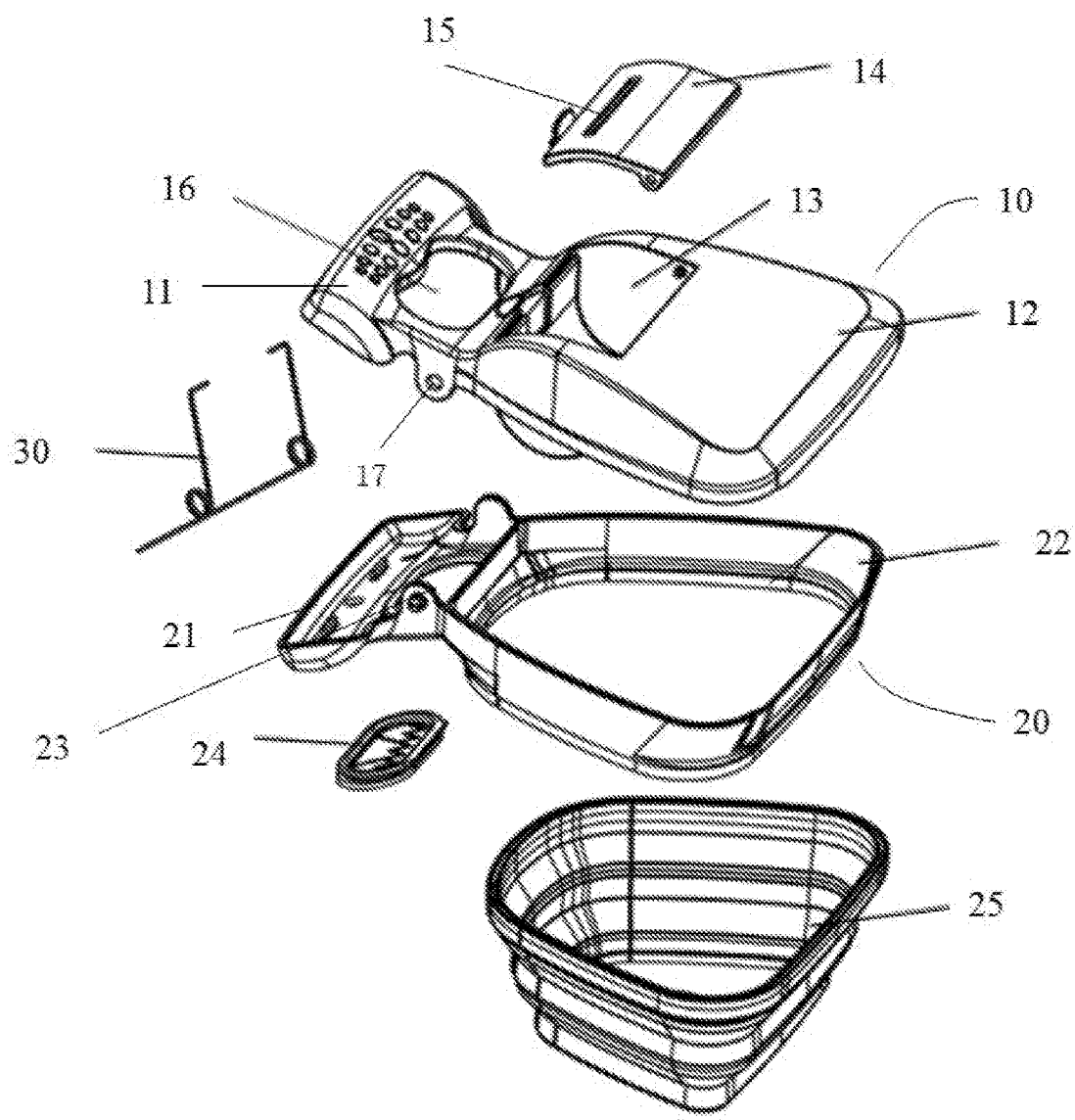
FIG. 1 is an exploded diagram of an overall structure of a foldable portable excrement pick-up device provided by an embodiment of the disclosure.

10, upper housing; 11, upper handle; 12; upper housing body; 13, garbage bag bin; 14, bin cover; 15, bag-taking opening; 16, hand-carrying hole; 17, upper hinging portion; 20, lower housing; 21, lower handle; 22, lower housing frame ring; 23, lower hinging portion; 24, fixing clip; 25, storage bin; 26, small handle; and 30, spring.

DETAILED DESCRIPTION OF THE EMBODIMENTS

In order to make the aims, technical solutions and advantages of the embodiments of the disclosure clearer, the technical solutions in the embodiments of the disclosure are clearly and completely described below with reference to the embodiments of the disclosure and the drawings. It is important to note that the described embodiments are only a part of the embodiments of the disclosure, not all of the embodiments. On the basis of the embodiments of the disclosure, all other embodiments obtained on the premise of no creative work of those skilled in the art fall within the protection scope of the disclosure.

Embodiment

With reference to FIG. 1 to FIG. 4, a foldable portable excrement pick-up device includes an upper housing 10 and a lower housing 20 which are combined to form a clip shape via a rotary shaft (not shown in Figure) and a spring 30. The upper housing 10 is composed of an upper handle 11 and a cap-shaped upper housing body 12, the upper handle 11 is arranged at the tail of the upper housing body 12, and an upper hinging portion 17 for rotary connection is arranged at a joint between the upper housing body 12 and the upper handle 11. The lower housing 20 is composed of a lower handle 21 and a bowl-shaped lower housing body, the lower handle 21 is arranged at the tail of the lower housing body, and a lower hinging portion 23 for rotary connection is arranged at a joint between the lower housing body and the lower handle 21. The upper handle 11 and the lower handle 21 are symmetrically arranged, the upper housing body 12 and the lower housing body are hinged to form a clip shape in such a way that the rotary shaft penetrates through the upper hinging portion 17 and the lower hinging portion 23, and the spring 30 is arranged between the upper handle 11 and the lower handle 21 to make the upper housing body 12 cover the lower housing body elastically in an openable/closeable manner.

Figure 2:
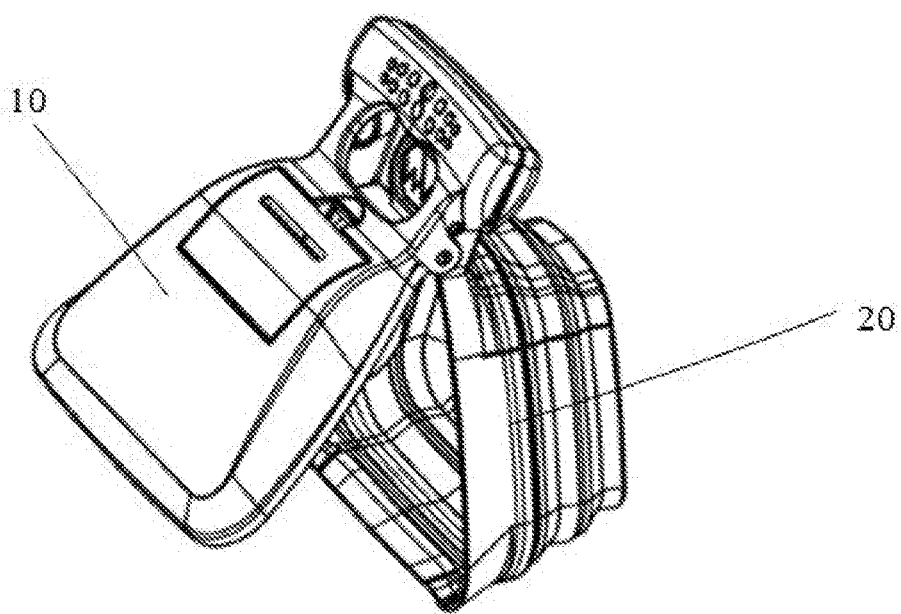
FIG. 2 is a diagram of a closed state of the disclosure.
Figure 3:
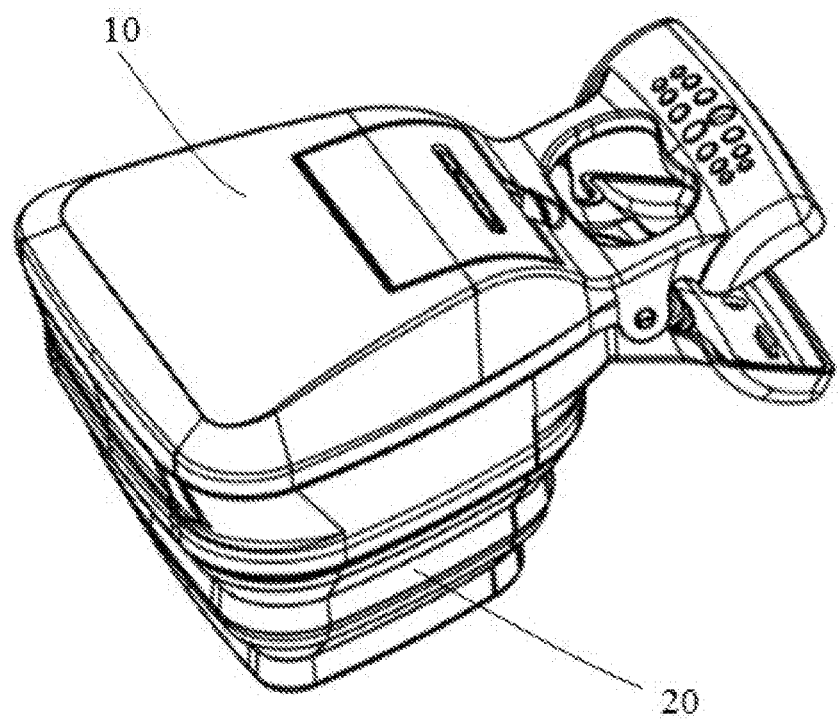
FIG. 3 is a diagram of an open state of the disclosure.

As shown in FIG. 2 to FIG. 3 in detail, the combination of the upper housing 10 and the lower housing 20 is similar to the structure of a clip, the upper housing 10 and the lower housing 20 can be opened by gripping and pressing the upper handle 11 and the lower handle 21 vigorously, and the upper housing 10 and the lower housing 20 will be reclosed under the return action of the spring 30 after loosening the upper handle 11 and the lower handle 21. Due to the normal closing design, the disclosure is higher in sealing performance and can effectively prevent excrement from leaking. When the device is used, the excrement of a pet can be put into the bowl-shaped lower housing body and stored, and is thrown together when a person approaches a garbage bin. In the whole process, it is hardly possible for the person to touch the excrement, thereby effectively guaranteeing the personal sanitation and the environmental sanitation, and avoiding spreading of germs.

The bowl-shaped lower housing body is a main component for storing excrement or garbage, and both a large-size rigid structure and a foldable flexible structure can be adopted. Further preferably, the lower housing body includes a rigid lower housing frame ring 22, a flexible storage bin 25 and a fixing clip 24 configured to fix a garbage bag, the lower housing frame ring 22 is in a frame shape matched with the upper housing body 12, the lower handle 21 is arranged at the tail of the lower housing frame ring 22, the lower hinging portion 23 is arranged at a joint between the lower housing frame ring 22 and the lower handle 21, an opening edge of the storage bin 25 is connected to the lower housing frame ring 22, and the fixing clip 24 is arranged on the lower handle 21.

Figure 4:
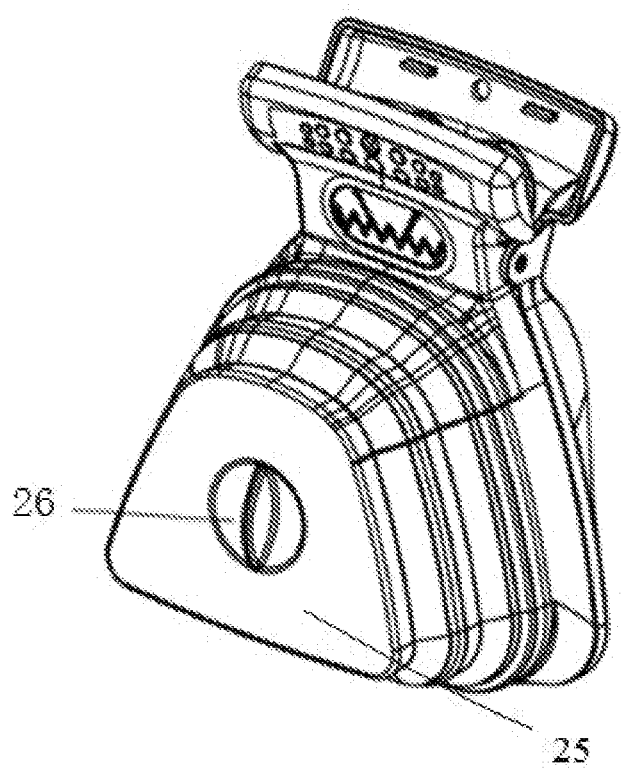
FIG. 4 is a diagram of a bottom structure of the disclosure.
Figure 1:
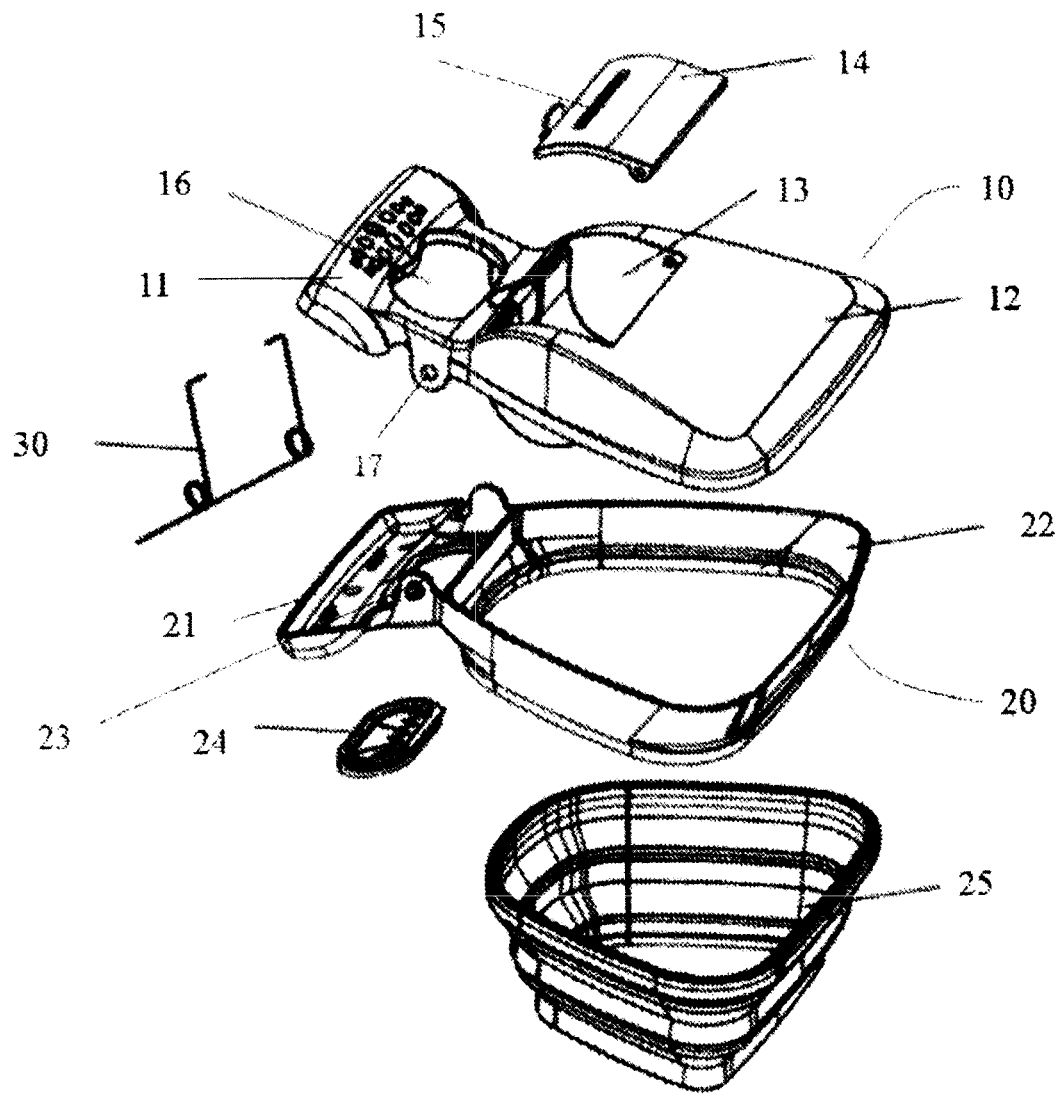
Figure 2:
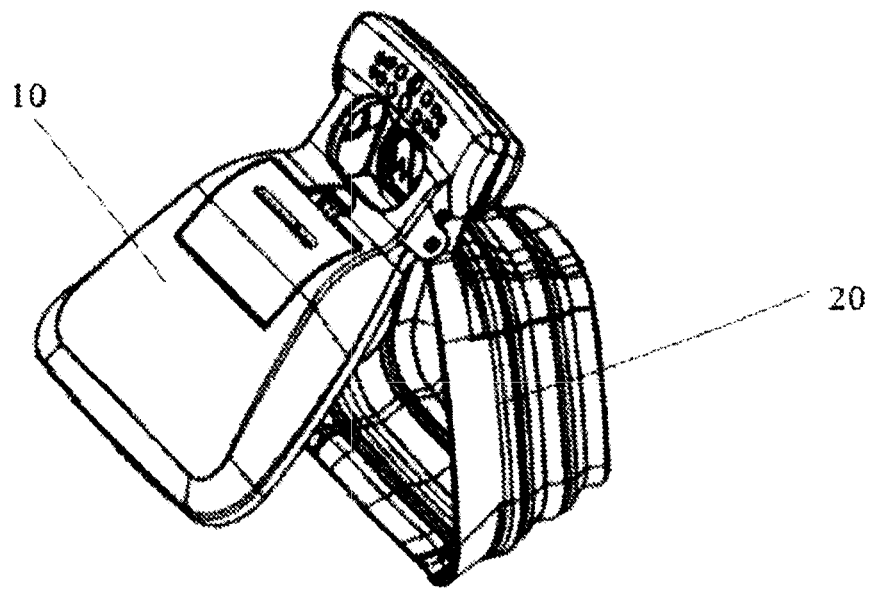
Figure 3:
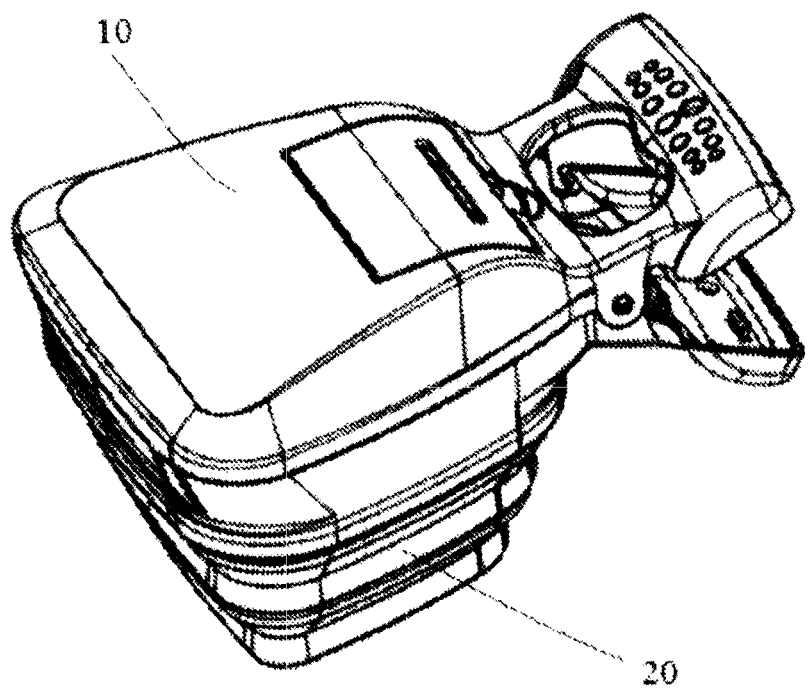
Figure 4:
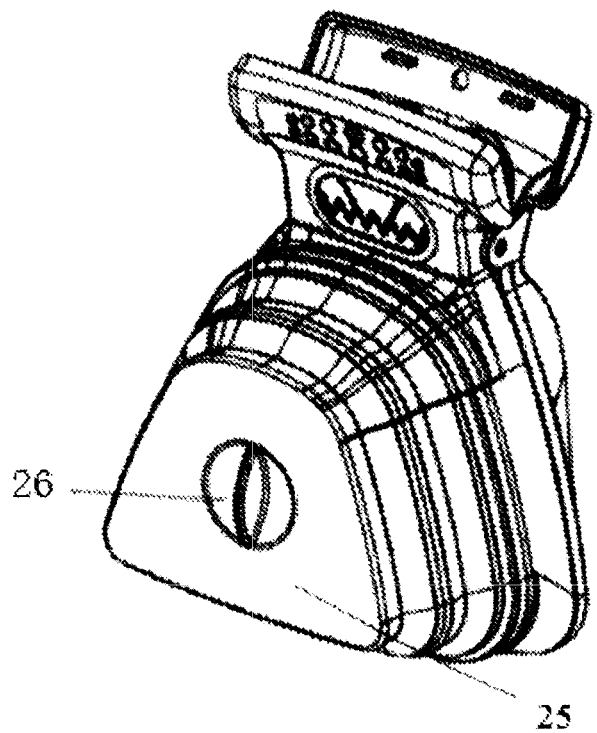

The lower housing frame ring 22 serves as a fixed frame body, which guarantees the stability of the flexible storage bin 25. The flexible storage bin 25 is convenient to fold, and can be stored in case of no use, thereby effectively reducing the storage size. With reference to FIG. 4, preferably, the storage bin 25 is made of a flexible material and is folded in a thin-film organ shape. Meanwhile, a small handle 26 is arranged on a bottom surface of the storage bin 25. In the using process, the storage bin 25 can be unfolded by pulling the small handle 26 so as to have a sufficient space which facilitates storage of excrement or garbage. A disposable garbage bag is laid inside the storage bin 25 generally, thereby aiding in keeping the storage bin 25 and the lower housing frame ring 22 clean; and when it is necessary to clear the excrement or the garbage therein off, the whole garbage bag is directly taken out and thrown. A bag opening of the garbage bag is expanded by the lower housing frame ring 22 and is fixed by the fixing clip 24.

Preferably, a garbage bag bin 13 is also disposed on the upper housing 10, the garbage bag bin 13 is a bin body arranged on a surface of the upper housing body 12 and recessed into the surface, an openable/closeable bin cover 14 is arranged at the top of the garbage bag bin 13, and a garbage bag outlet is provided on the bin cover 14.

The garbage bag is one of consumables cooperating with the device provided by the disclosure, and needs to be replaced almost every time. In order to facilitate replacement and storage of the garbage bag, according to the disclosure, the garbage bag bin 13 is designed on the upper housing 10, and the garbage can be pre-stored in the garbage bag bin 13 and is taken out from the garbage bag bin 13 as needed. The garbage bag bin 13 and the upper housing body 12 can be formed integrally.

Specifically speaking, preferably, one end of the bin cover 14 is hinged to the upper housing body 12, and the other end of the bin cover is provided with an elastic buckle configured to control the bin cover 14 to be opened and closed. The elastic buckle buckles the bin cover 14 and the garbage bag bin 13 together to ensure that the bin cover cannot be opened randomly in the using process. The garbage bag stored in the garbage bag bin 13 will not fall accidentally. Further preferably, the bin cover 14 is further provided with an elongated bag-taking opening 15. Zigzags can also be additionally disposed on the bag-taking opening 15. So, when the garbage bag is stored in the garbage bag bin 13, an end of the garbage bag can be exposed from the bag-taking opening 15, and the garbage bag can be taken out by gripping the end of the garbage bag and pulling it out. The principle is similar to that of a toilet paper box, so that the device can be more conveniently used, bag taking can be completed with a single hand, and inconvenience caused by both-hand operation is avoided.

Preferably, a hand-carrying hole 16 is provided on the upper handle 11, and the device can be carried in hand usually by gripping the hand-carrying hole 16.

The foldable portable excrement pick-up device provided by the disclosure is convenient to clear excrement and garbage off, and it is only necessary to throw the excrement and the garbage into the device which is opened in a clear-off process, thereby preventing a human body from being polluted by the excrement or the garbage in the clear-off process to the greatest extent. The personal sanitation is effectively guaranteed, and spreading of the disease is reduced. The device is convenient to use and carry, has a simple structure, is foldable, and effectively reduces a storage space. Moreover, the device is safe to use, the sealing performance is guaranteed by virtue of a normally closed structure, the excrement can be effectively prevented from leaking, and the device can be used for temporarily storing the excrement or the garbage.

The embodiment only expresses an implementation mode of the disclosure, is described specifically in detail, but cannot be interpreted as limitations to the patent scope of the disclosure accordingly. It should be pointed out that those skilled in the art can also make some modifications and improvements without departing from the concept of the disclosure. These modifications and improvements fall within the protection scope of the disclosure. Consequently, the patent protection scope of the disclosure shall be subject to attached claims.

The invention claimed is:

1. A foldable portable excrement pick-up device, comprising an upper housing and a lower housing which are combined to form a clip shape via a rotary shaft and a spring, wherein:

the upper housing is composed of an upper handle and a cap-shaped upper housing body, the upper handle is arranged at the tail of the upper housing body, and an upper hinging portion for rotary connection is arranged at a joint between the upper housing body and the upper handle;

the lower housing is composed of a lower handle and a bowl-shaped lower housing body, the lower handle is arranged at the tail of the lower housing body, and a lower hinging portion for rotary connection is arranged at a joint between the lower housing body and the lower handle;

the upper handle and the lower handle are symmetrically arranged, the upper housing body and the lower housing body are hinged to form a clip shape in such a way that the rotary shaft penetrates through the upper hinging portion and the lower hinging portion, and the spring is arranged between the upper handle and the lower handle to make the upper housing body cover the lower housing body elastically in an openable/closeable manner; and the lower housing body comprises a rigid lower housing frame ring, a flexible storage bin and a fixing clip configured to fix a garbage bag; the lower housing frame ring is in a frame shape matched with the upper housing body, the lower handle is arranged at the tail of the lower housing frame ring, and the lower hinging portion is arranged at a joint between the lower housing frame ring and the lower handle; an opening edge of the storage bin is connected to the lower housing frame ring; and the fixing clip is arranged on the lower handle.

2. The foldable portable excrement pick-up device according to claim 1, wherein a garbage bag bin is also disposed on the upper housing, the garbage bag bin is a bin body arranged on a surface of the upper housing and recessed into the surface, an openable/closeable bin cover is arranged at the top of the garbage bag bin, and a garbage bag outlet is provided on the bin cover.

3. The foldable portable excrement pick-up device according to claim 2, wherein one end of the bin cover is hinged to the upper housing body, and the other end of the bin cover is provided with an elastic buckle configured to control the bin cover to be opened and closed.

4. The foldable portable excrement pick-up device according to claim 2, wherein the bin cover is further provided with an elongated bag-taking opening.

5. The foldable portable excrement pick-up device according to claim 1, wherein a hand-carrying hole is provided on the upper handle.

6. The foldable portable excrement pick-up device according to claim 1, wherein the storage bin is made of a flexible material and is folded in a thin-film organ shape.

7. The foldable portable excrement pick-up device according to claim 1, wherein a small handle is arranged on a bottom surface of the storage bin.

* * * * *

UNITED STATES PATENT AND TRADEMARK OFFICE
CERTIFICATE OF CORRECTION

PATENT NO.      : 9,556,571 B1
APPLICATION NO. : 15/153916
DATED           : January 31, 2017
INVENTOR(S)     : Yang et al.

It is certified that error appears in the above-identified patent and that said Letters Patent is hereby corrected as shown below:

Please delete Patent 9,556,571 B1 in its entirety and insert Patent 9,556,571 B1 in its entirety as shown on the attached pages Signed and Sealed this
Eleventh Day of April, 2017

Michelle K. Lee
*Director of the United States Patent and Trademark Office*

United States Patent
Yang et al.

(12) 
(10) Patent No.: US 9,556,571 B1
(45) Date of Patent: Jan. 31, 2017

(54) FOLDABLE PORTABLE EXCREMENT PICK-UP DEVICE

(71) Applicants: Tianle Yang, Guangdong (CN); Yibao Zeng, Guangdong (CN)

(72) Inventors: Tianle Yang, Guangdong (CN); Yibao Zeng, Guangdong (CN)

(73) Assignee: ZHUHAI HENGQIN SUPER TECHNOLOGY LTD., Zhuhai (CN)

( * ) Notice: Subject to any disclaimer, the term of this patent is extended or adjusted under 35 U.S.C. 154(b) by 0 days.

(21) Appl. No.: 15/153,916

(22) Filed: May 13, 2016

(30) Foreign Application Priority Data

Nov. 10, 2015 (CN) .................... 2015 2 0894853 U

(51) Int. Cl.
*E01H 1/12* (2006.01)
*A01K 29/00* (2006.01)
*A01K 1/01* (2006.01)

(52) U.S. Cl.
CPC .......... *E01H 1/1206* (2013.01); *A01K 1/0114* (2013.01); *E01H 2001/128* (2013.01); *E01H 2001/1286* (2013.01)

(58) Field of Classification Search
CPC ............ E01H 1/1206; E01H 2001/126; E01H 2001/128; E01H 2001/1286; A01K 1/0114
USPC .................................................. 294/1.3
See application file for complete search history.

(56) References Cited

U.S. PATENT DOCUMENTS

| | | | | |
|---|---|---|---|---|
| 3,986,744 | A | * | 10/1976 | Krogstad ............ E01H 1/1206 119/867 |
| 5,385,376 | A | * | 1/1995 | Malaspina ........... E01H 1/1206 15/257.6 |
| 5,564,763 | A | * | 10/1996 | Mercurio ............ E01H 1/1206 294/1.3 |
| 5,669,645 | A | * | 9/1997 | Chuang ............... E01H 1/1206 294/1.3 |
| 6,059,332 | A | * | 5/2000 | Beascoechea Inchaurraga ......... E01H 1/1206 294/1.3 |
| 6,986,325 | B1 | * | 1/2006 | Hsu ..................... E01H 1/1206 119/161 |
| 2009/0261603 | A1 | * | 10/2009 | Boghozian ........... E01H 1/1206 294/1.3 |

FOREIGN PATENT DOCUMENTS

DE          9203156      *  6/1993

* cited by examiner

*Primary Examiner* — Dean Kramer

(57) ABSTRACT

The disclosure provides a foldable portable excrement pick-up device. The device includes an upper housing and a lower housing which are combined to form a clip shape via a rotary shaft and a spring. The upper housing is composed of an upper handle and a cap-shaped upper housing body. The lower housing is composed of a lower handle and a bowl-shaped lower housing body. The upper handle and the lower handle are symmetrically arranged, the upper housing body and the lower housing body are hinged to form a clip shape in such a way that the rotary shaft penetrates through the upper hinging portion and the lower hinging portion, and the spring is arranged between the upper handle and the lower handle to make the upper housing body cover the lower housing body elastically in an openable/closeable manner.

7 Claims, 3 Drawing Sheets

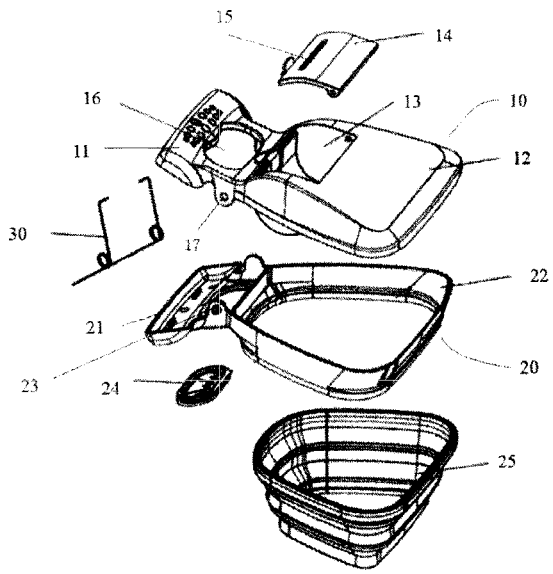

FOLDABLE PORTABLE EXCREMENT PICK-UP DEVICE

CROSS-REFERENCE TO RELATED APPLICATIONS

The present application claims the benefit of Chinese Utility Model Application No. 201520894853.4 filed on Nov. 10, 2015, the contents of which are hereby incorporated by reference.

TECHNICAL FIELD

The disclosure relates to the field of pet supplies, and in particular to a foldable portable excrement pick-up device.

BACKGROUND

With the improvement of living standards, an increasing number of people begin to feed pets. People enjoy going out for a walk with pets at their leisure. However, the pets will defecate inevitably in this process, and excrement affects both the environment and the city appearance, and affects the physical health of people as well due to parasite spreading. A feeder needs to self-clear the excrement of a pet off in a general mode of picking the excrement up with paper by hand, transporting the excrement to an adjacent garbage bin and then throwing the excrement in it. This mode is not only inconvenient, but also insanitary. In the excrement clear-off process, the feeder will touch the excrement of the pet inevitably, and the disease is probably spread in this process.

It is not hard to see that the traditional art also has certain defects.

SUMMARY

The disclosure is intended to solve the technical problem about provision of a foldable portable excrement pick-up device, which assists in solving the problem of excrement handling after a pet defecates.

In order to achieve the aim, the disclosure adopts the technical solutions as follows.

A foldable portable excrement pick-up device is provided, which may include an upper housing and a lower housing which are combined to form a clip shape via a rotary shaft and a spring.

The upper housing may be composed of an upper handle and a cap-shaped upper housing body, the upper handle may be arranged at the tail of the upper housing body, and an upper hinging portion for rotary connection may be arranged at a joint between the upper housing body and the upper handle.

The lower housing may be composed of a lower handle and a bowl-shaped lower housing body, the lower handle may be arranged at the tail of the lower housing body, and a lower hinging portion for rotary connection may be arranged at a joint between the lower housing body and the lower handle.

The upper handle and the lower handle may be symmetrically arranged, the upper housing body and the lower housing body may be hinged to form a clip shape in such a way that the rotary shaft penetrates through the upper hinging portion and the lower hinging portion, and the spring may be arranged between the upper handle and the lower handle to make the upper housing body cover the lower housing body elastically in an openable/closeable manner.

Furthermore, the lower housing body may include a rigid lower housing frame ring, a flexible storage bin and a fixing clip configured to fix a garbage bag, the lower housing frame ring may be in a frame shape matched with the upper housing body, the lower handle may be arranged at the tail of the lower housing frame ring, the lower hinging portion may be arranged at a joint between the lower housing frame ring and the lower handle, an opening edge of the storage bin may be connected to the lower housing frame ring, and the fixing clip may be arranged on the lower handle.

Furthermore, a garbage bag bin may also be disposed on the upper housing, the garbage bag bin may be a bin body arranged on a surface of the upper housing and recessed into the surface, an openable/closeable bin cover may be arranged at the top of the garbage bag bin, and a garbage bag outlet may be provided on the bin cover.

Furthermore, one end of the bin cover may be hinged to the upper housing body, and the other end of the bin cover may be provided with an elastic buckle configured to control the bin cover to be opened and closed.

Furthermore, the bin cover may be further provided with an elongated bag-taking opening.

Furthermore, a hand-carrying hole may be provided on the upper handle.

Furthermore, the storage bin may be made of a flexible material and may be folded in a thin-film organ shape.

Furthermore, a small handle may be arranged on a bottom surface of the storage bin.

The foldable portable excrement pick-up device provided by the disclosure has the advantages as follows.

The device is convenient to clear excrement and garbage off, thereby preventing a human body from being polluted by the excrement or the garbage in a clear-off process to the greatest extent.

The device is convenient to use and carry, has a simple structure, is foldable, and effectively reduces a packaging size.

The device is safe to use and strong in sealing performance, can effectively prevent the excrement from leaking, and can be used for temporarily storing the excrement or the garbage.

BRIEF DESCRIPTION OF THE DRAWINGS

In order to describe the technical solutions in the embodiments of the disclosure or the traditional art more clearly, the drawings needing to be used in the descriptions of the embodiments or the traditional art will be simply introduced. Obviously, the drawings described below are only some embodiments of the disclosure. Other embodiments can be obtained according to these drawings on the premise of no creative work of those skilled in the art.

FIG. 1 is an exploded diagram of an overall structure of a foldable portable excrement pick-up device provided by an embodiment of the disclosure;

FIG. 2 is a diagram of a closed state of the disclosure;

FIG. 3 is a diagram of an open state of the disclosure; and

FIG. 4 is a diagram of a bottom structure of the disclosure.

DRAWING MARK DESCRIPTIONS 10, upper housing; 11, upper handle; 12; upper housing body; 13, garbage bag bin; 14, bin cover; 15, bag-taking opening; 16, hand-carrying hole; 17, upper hinging portion; 20, lower housing; 21, lower handle; 22, lower housing frame ring; 23, lower hinging portion; 24, fixing clip; 25, storage bin; 26, small handle; and 30, spring.

DETAILED DESCRIPTION OF THE EMBODIMENTS

In order to make the aims, technical solutions and advantages of the embodiments of the disclosure clearer, the technical solutions in the embodiments of the disclosure are clearly and completely described below with reference to the embodiments of the disclosure and the drawings. It is important to note that the described embodiments are only a part of the embodiments of the disclosure, not all of the embodiments. On the basis of the embodiments of the disclosure, all other embodiments obtained on the premise of no creative work of those skilled in the art fall within the protection scope of the disclosure.

Embodiment

With reference to FIG. 1 to FIG. 4, a foldable portable excrement pick-up device includes an upper housing 10 and a lower housing 20 which are combined to form a clip shape via a rotary shaft (not shown in Figure) and a spring 30. The upper housing 10 is composed of an upper handle 11 and a cap-shaped upper housing body 12, the upper handle 11 is arranged at the tail of the upper housing body 12, and an upper hinging portion 17 for rotary connection is arranged at a joint between the upper housing body 12 and the upper handle 11. The lower housing 20 is composed of a lower handle 21 and a bowl-shaped lower housing body, the lower handle 21 is arranged at the tail of the lower housing body, and a lower hinging portion 23 for rotary connection is arranged at a joint between the lower housing body and the lower handle 21. The upper handle 11 and the lower handle 21 are symmetrically arranged, the upper housing body 12 and the lower housing body are hinged to form a clip shape in such a way that the rotary shaft penetrates through the upper hinging portion 17 and the lower hinging portion 23, and the spring 30 is arranged between the upper handle 11 and the lower handle 21 to make the upper housing body 12 cover the lower housing body elastically in an openable/closeable manner.

As shown in FIG. 2 to FIG. 3 in detail, the combination of the upper housing 10 and the lower housing 20 is similar to the structure of a clip, the upper housing 10 and the lower housing 20 can be opened by gripping and pressing the upper handle 11 and the lower handle 21 vigorously, and the upper housing 10 and the lower housing 20 will be reclosed under the return action of the spring 30 after loosening the upper handle 11 and the lower handle 21. Due to the normal closing design, the disclosure is higher in sealing performance and can effectively prevent excrement from leaking. When the device is used, the excrement of a pet can be put into the bowl-shaped lower housing body and stored, and is thrown together when a person approaches a garbage bin. In the whole process, it is hardly possible for the person to touch the excrement, thereby effectively guaranteeing the personal sanitation and the environmental sanitation, and avoiding spreading of germs.

The bowl-shaped lower housing body is a main component for storing excrement or garbage, and both a large-size rigid structure and a foldable flexible structure can be adopted. Further preferably, the lower housing body includes a rigid lower housing frame ring 22, a flexible storage bin 25 and a fixing clip 24 configured to fix a garbage bag, the lower housing frame ring 22 is in a frame shape matched with the upper housing body 12, the lower handle 21 is arranged at the tail of the lower housing frame ring 22, the lower hinging portion 23 is arranged at a joint between the lower housing frame ring 22 and the lower handle 21, an opening edge of the storage bin 25 is connected to the lower housing frame ring 22, and the fixing clip 24 is arranged on the lower handle 21.

The lower housing frame ring 22 serves as a fixed frame body, which guarantees the stability of the flexible storage bin 25. The flexible storage bin 25 is convenient to fold, and can be stored in case of no use, thereby effectively reducing the storage size. With reference to FIG. 4, preferably, the storage bin 25 is made of a flexible material and is folded in a thin-film organ shape. Meanwhile, a small handle 26 is arranged on a bottom surface of the storage bin 25. In the using process, the storage bin 25 can be unfolded by pulling the small handle 26 so as to have a sufficient space which facilitates storage of excrement or garbage. A disposable garbage bag is laid inside the storage bin 25 generally, thereby aiding in keeping the storage bin 25 and the lower housing frame ring 22 clean; and when it is necessary to clear the excrement or the garbage therein off, the whole garbage bag is directly taken out and thrown. A bag opening of the garbage bag is expanded by the lower housing frame ring 22 and is fixed by the fixing clip 24.

Preferably, a garbage bag bin 13 is also disposed on the upper housing 10, the garbage bag bin 13 is a bin body arranged on a surface of the upper housing body 12 and recessed into the surface, an openable/closeable bin cover 14 is arranged at the top of the garbage bag bin 13, and a garbage bag outlet is provided on the bin cover 14.

The garbage bag is one of consumables cooperating with the device provided by the disclosure, and needs to be replaced almost every time. In order to facilitate replacement and storage of the garbage bag, according to the disclosure, the garbage bag bin 13 is designed on the upper housing 10, and the garbage can be pre-stored in the garbage bag bin 13 and is taken out from the garbage bag bin 13 as needed. The garbage bag bin 13 and the upper housing body 12 can be formed integrally.

Specifically speaking, preferably, one end of the bin cover 14 is hinged to the upper housing body 12, and the other end of the bin cover is provided with an elastic buckle configured to control the bin cover 14 to be opened and closed. The elastic buckle buckles the bin cover 14 and the garbage bag bin 13 together to ensure that the bin cover cannot be opened randomly in the using process. The garbage bag stored in the garbage bag bin 13 will not fall accidentally. Further preferably, the bin cover 14 is further provided with an elongated bag-taking opening 15. Zigzags can also be additionally disposed on the bag-taking opening 15. So, when the garbage bag is stored in the garbage bag bin 13, an end of the garbage bag can be exposed from the bag-taking opening 15, and the garbage bag can be taken out by gripping the end of the garbage bag and pulling it out. The principle is similar to that of a toilet paper box, so that the device can be more conveniently used, bag taking can be completed with a single hand, and inconvenience caused by both-hand operation is avoided.

Preferably, a hand-carrying hole 16 is provided on the upper handle 11, and the device can be carried in hand usually by gripping the hand-carrying hole 16.

The foldable portable excrement pick-up device provided by the disclosure is convenient to clear excrement and garbage off, and it is only necessary to throw the excrement and the garbage into the device which is opened in a clear-off process, thereby preventing a human body from being polluted by the excrement or the garbage in the clear-off process to the greatest extent. The personal sanitation is effectively guaranteed, and spreading of the disease is reduced. The device is convenient to use and carry, has a simple structure, is foldable, and effectively reduces a storage space. Moreover, the device is safe to use, the sealing performance is guaranteed by virtue of a normally closed structure, the excrement can be effectively prevented from leaking, and the device can be used for temporarily storing the excrement or the garbage.

The embodiment only expresses an implementation mode of the disclosure, is described specifically in detail, but cannot be interpreted as limitations to the patent scope of the disclosure accordingly. It should be pointed out that those skilled in the art can also make some modifications and improvements without departing from the concept of the disclosure. These modifications and improvements fall within the protection scope of the disclosure. Consequently, the patent protection scope of the disclosure shall be subject to attached claims.

The invention claimed is:

1. A foldable portable excrement pick-up device, comprising an upper housing and a lower housing which are combined to form a clip shape via a rotary shaft and a spring, wherein:
    the upper housing is composed of an upper handle and a cap-shaped upper housing body, the upper handle is arranged at the tail of the upper housing body, and an upper hinging portion for rotary connection is arranged at a joint between the upper housing body and the upper handle;
    the lower housing is composed of a lower handle and a bowl-shaped lower housing body, the lower handle is arranged at the tail of the lower housing body, and a lower hinging portion for rotary connection is arranged at a joint between the lower housing body and the lower handle;
    the upper handle and the lower handle are symmetrically arranged, the upper housing body and the lower housing body are hinged to form a clip shape in such a way that the rotary shaft penetrates through the upper hinging portion and the lower hinging portion, and the spring is arranged between the upper handle and the lower handle to make the upper housing body cover the lower housing body elastically in an openable/closeable manner; and
    the lower housing body comprises a rigid lower housing frame ring, a flexible storage bin and a fixing clip configured to fix a garbage bag; the lower housing frame ring is in a frame shape matched with the upper housing body, the lower handle is arranged at the tail of the lower housing frame ring, and the lower hinging portion is arranged at a joint between the lower housing frame ring and the lower handle; an opening edge of the storage bin is connected to the lower housing frame ring; and the fixing clip is arranged on the lower handle.

2. The foldable portable excrement pick-up device according to claim 1, wherein a garbage bag bin is also disposed on the upper housing, the garbage bag bin is a bin body arranged on a surface of the upper housing and recessed into the surface, an openable/closeable bin cover is arranged at the top of the garbage bag bin, and a garbage bag outlet is provided on the bin cover.

3. The foldable portable excrement pick-up device according to claim 2, wherein one end of the bin cover is hinged to the upper housing body, and the other end of the bin cover is provided with an elastic buckle configured to control the bin cover to be opened and closed.

4. The foldable portable excrement pick-up device according to claim 2, wherein the bin cover is further provided with an elongated bag-taking opening.

5. The foldable portable excrement pick-up device according to claim 1, wherein a hand-carrying hole is provided on the upper handle.

6. The foldable portable excrement pick-up device according to claim 1, wherein the storage bin is made of a flexible material and is folded in a thin-film organ shape.

7. The foldable portable excrement pick-up device according to claim 1, wherein a small handle is arranged on a bottom surface of the storage bin.

* * * * *